United States Patent [19]
Diggs

[11] Patent Number: 5,657,728
[45] Date of Patent: Aug. 19, 1997

[54] PLANAR CRANKSHAFT BALANCE SYSTEM

[75] Inventor: Matthew Byrne Diggs, Farmington, Mich.

[73] Assignee: Ford Motor Company, Dearborn, Mich.

[21] Appl. No.: 512,378

[22] Filed: Aug. 7, 1995

[51] Int. Cl.$^6$ .................................................. F02B 75/06
[52] U.S. Cl. ........................................................ 123/192.2
[58] Field of Search ................................ 123/192.2, 54.4, 123/54.7; 74/603

[56]  References Cited

U.S. PATENT DOCUMENTS 4,644,916  2/1987  Kitagawa ........................ 123/192.2
4,683,849  8/1987  Brown ............................. 123/192.2
4,936,268  6/1990  Randle ............................ 123/192.2

*Primary Examiner*—Noah P. Kamen
*Attorney, Agent, or Firm*—Jerome R. Drouillard; Roger L. May

[57] ABSTRACT

A balance system for a planar crankshaft on a V configuration internal combustion engine including a first balance shaft located above the planar crankshaft inside a vee of the engine and a second balance shaft located below the planar crankshaft, and a mechanism interconnecting the first balance shaft, the planar crankshaft and the second balance shaft to rotate the first balance shaft and the second balance shaft in opposite directions to balance the engine.

12 Claims, 4 Drawing Sheets

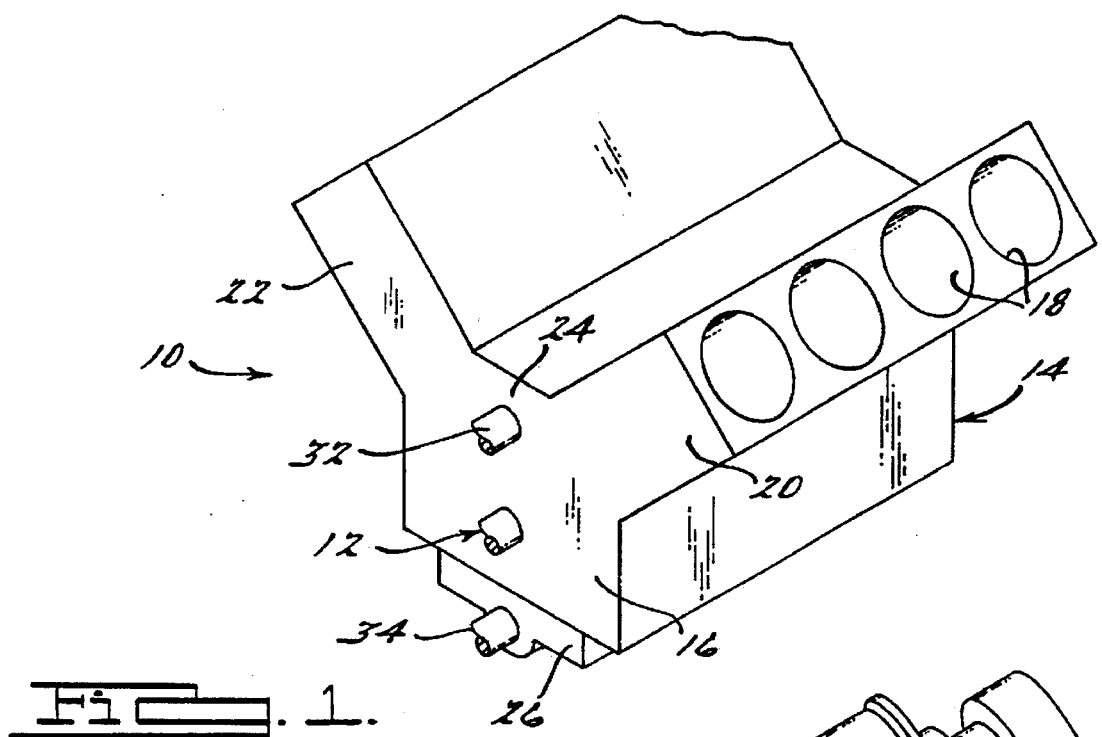
Fig. 1.
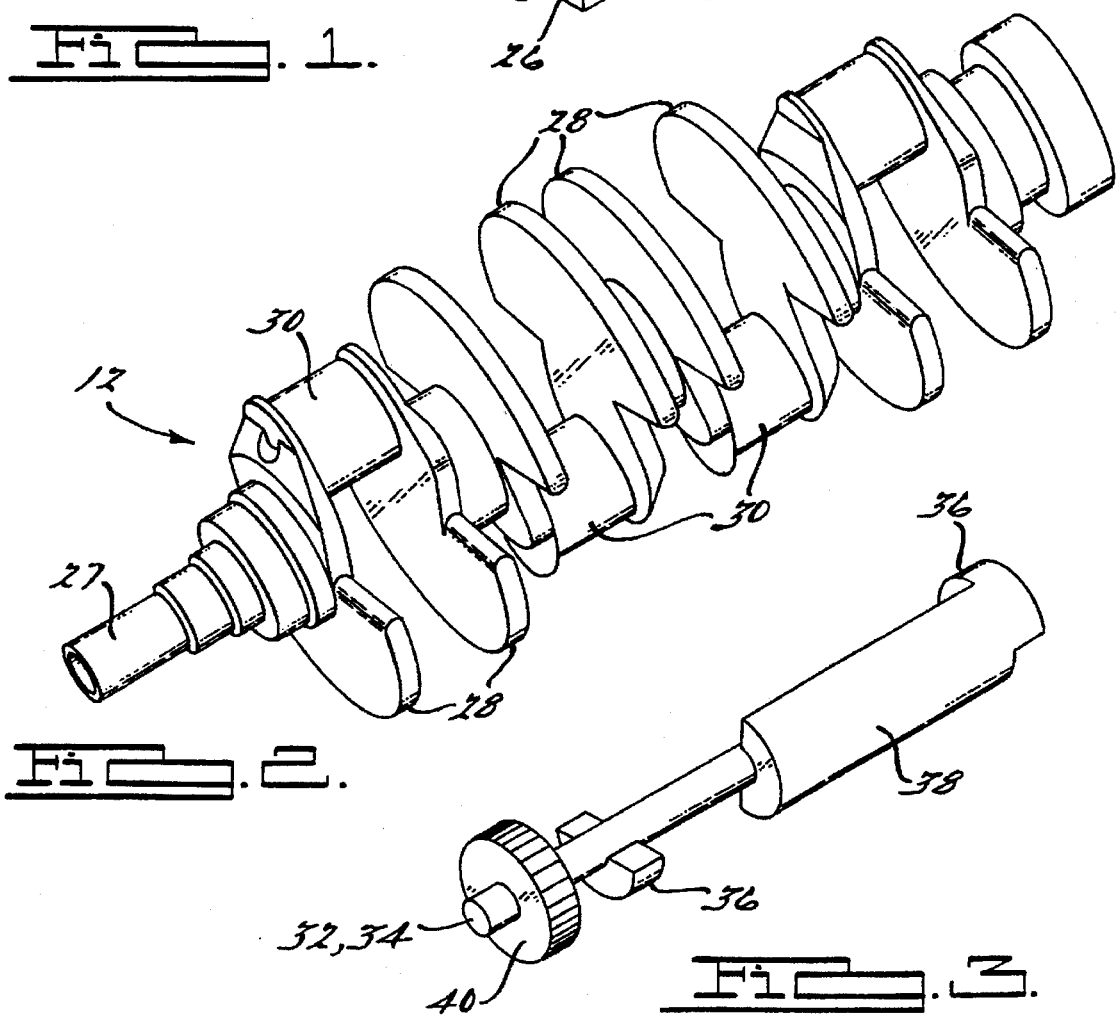
Fig. 2.
Fig. 3.

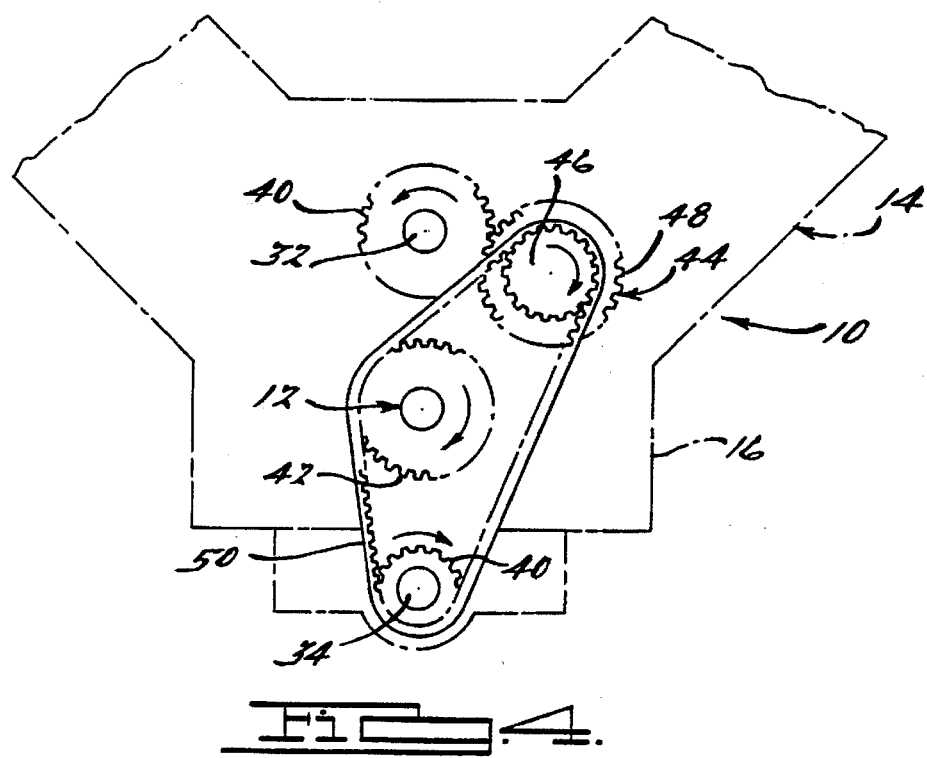
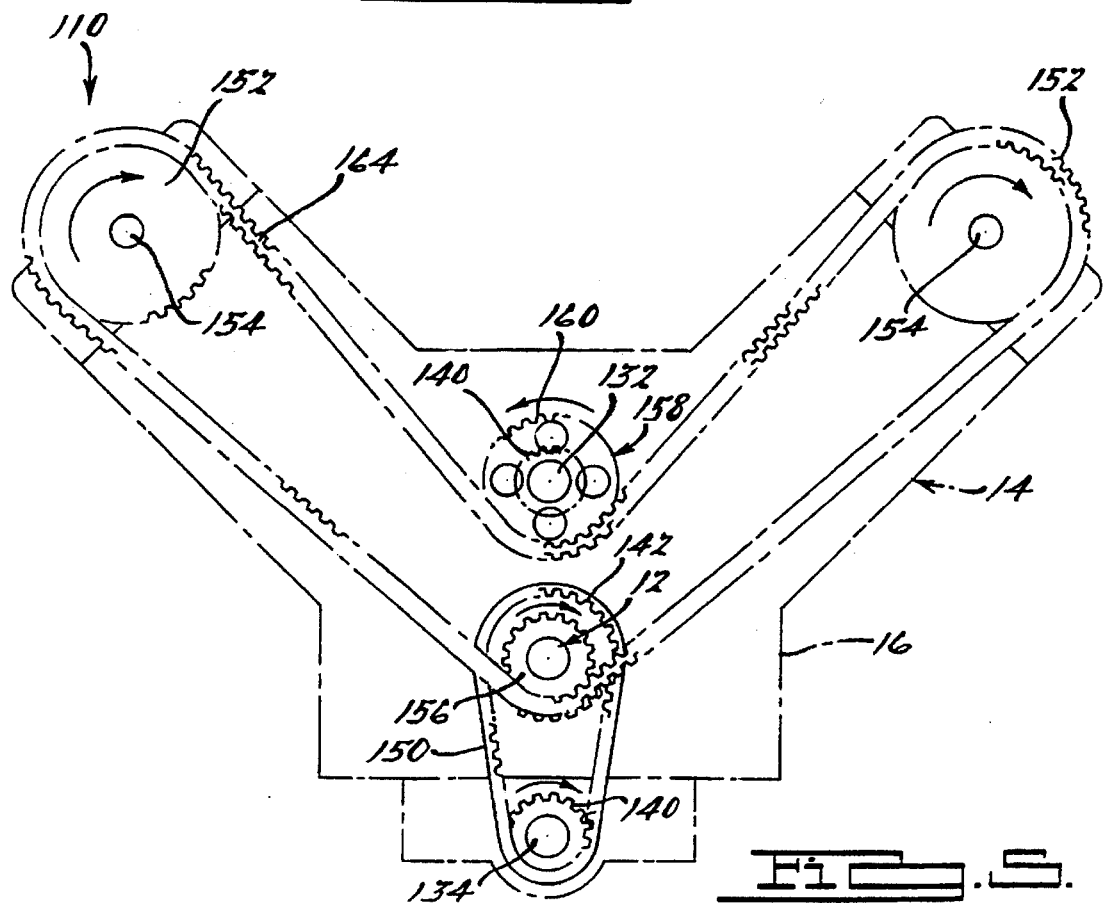

PLANAR CRANKSHAFT BALANCE SYSTEM

BACKGROUND OF THE INVENTION

1. Field of the Invention

The present invention relates generally to planar crankshafts on internal combustion engines and, more specifically, to a balance system for a planar crankshaft on a V configuration internal combustion engine.

2. Description of the Related Art

It is known to use a "V" configuration for an internal combustion engine on automotive vehicles. A majority of V-8 configuration engines employ a "cruciform" or "90-degree" style crankshaft; that is, a crankshaft with four throws which are each offset by ninety degrees (90°). This crankshaft configuration is preferred over other available choices for a V-8 because it allows for a fully balanced engine with proper counterweights on the crankshaft.

Three other crankshafts which can be employed in the V-8 configuration engine to achieve even firing are "180-degree" style crankshafts; that is, a crankshaft with throws that are offset by one hundred eighty degrees (180°) instead of ninety degrees (90°). This crankshaft configuration is called "planar" or "flat" since all of the journals and throws are co-planar. The planar crankshaft allows for even firing banks of cylinders, i.e., each bank of cylinders has a consistent 180 degree firing interval whereas a V-8 engine with a cruciform crankshaft does not. This provides improved consistency in the airflow which makes the engine run smoother and more efficiently. The cruciform crankshaft V-8 engine is the only commonly produced engine configuration which does not have even firing banks of cylinders.

Although the planar crankshaft has worked well in the V configuration engine, it suffers from the disadvantage of an inherent second order imbalance which consists of shaking forces and moments that cycle at twice the speed of the crankshaft.

One attempt to achieve total balance in a planar crankshaft V-8 configuration engine is disclosed in U.S. Pat. No. 4,936,238 to Randle. This patent discloses a balance system having dual counter-rotating balance shafts which act to cancel out the vibrations which are inherent to the V configuration engine. The patented balance system is mounted on a side of the V configuration engine.

One disadvantage of the above patented balance system is that space is needed on the side of the engine to mount the balance system which may not be available. Therefore, there is a need in the art to provide a balance system for a planar crankshaft on a V configuration engine which is compact and does not require space on the side of the engine.

SUMMARY OF THE INVENTION

Accordingly, the present invention is a balance system for a planar crankshaft on a V configuration internal combustion engine. The balance system includes a first balance shaft located above the planar crankshaft inside the vee of a V configuration internal combustion engine and a second balance shaft located below the planar crankshaft. The balance system also includes a mechanism interconnecting the first balance shaft, the planar crankshaft and the second balance shaft to rotate the first balance shaft and the second balance shaft in opposite directions and at twice the speed of the crankshaft to balance the engine.

One advantage of the present invention is that a balance system is provided for a planar crankshaft on a V-configuration internal combustion engine which cancels out the inherent second order imbalance, resulting in reduced noise, vibration and harshness. Another advantage of the present invention is that the balance system has one balance shaft located above the crankshaft inside the vee and another balance shaft located below the crankshaft, making it more compact and eliminating the use of space on the side of the engine for the balance system.

Other features and advantages of the present invention will be readily appreciated as the same becomes better understood after reading the subsequent description taken in conjunction with the accompanying drawings.

BRIEF DESCRIPTION OF THE DRAWINGS

FIG. 1 is a perspective view of a balance system, according to the present invention, for a planar crankshaft on a V configuration internal combustion engine.

FIG. 2 is a perspective view of the planar crankshaft on the V configuration internal combustion engine of FIG. 1.

FIG. 3 is perspective view of a portion of the balance system of FIG. 1.

FIG. 4 is a front view of the balance system of FIG. 1 with the engine shown in phantom lines.

FIG. 5 is a view similar to FIG. 4 of another embodiment, according to the present invention, of the balance system of FIG. 1.

DESCRIPTION OF THE PREFERRED EMBODIMENT(S)

Figure 6:
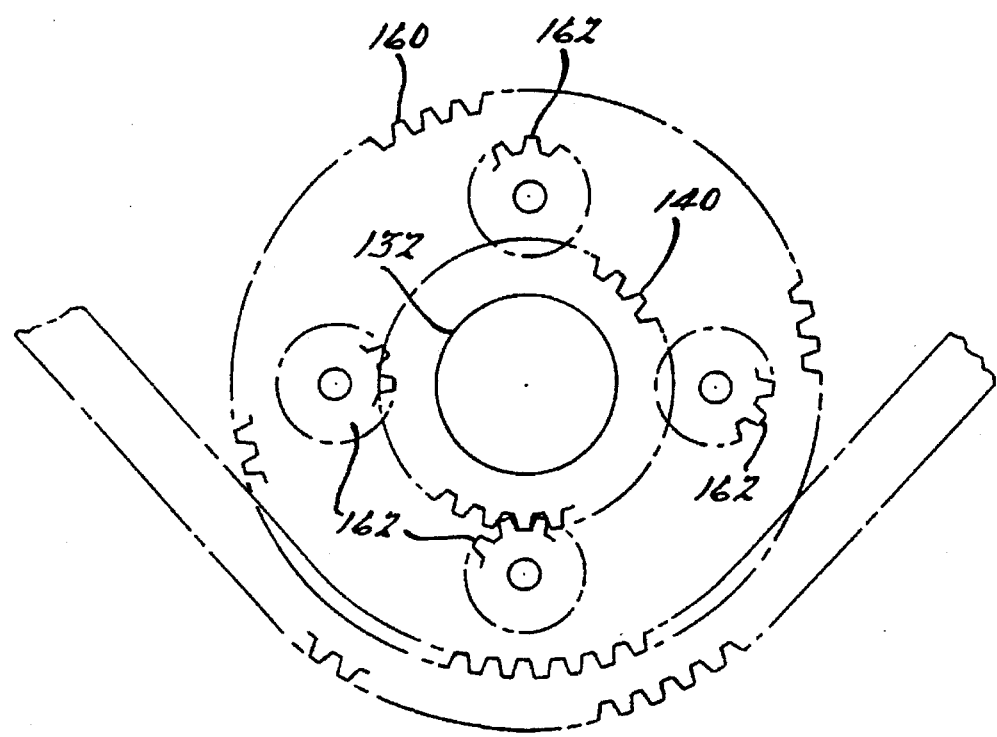
FIG. 6 is an enlarged view of a portion of the balance system of FIG. 5.

Referring to the drawings and in particular to FIG. 1, one embodiment of a balance system 10, according to the present invention, is shown for a planar crankshaft 12 on a "V" configuration internal combustion engine 14. The V configuration internal combustion engine 14 has an engine block 16 with a plurality of cylinders 18 in a first bank 20 and a second bank 22 which is separated by a block valley 24 to form a vee. The V configuration internal combustion engine 14 also has a sump 26 attached to the engine block 16 opposite the block valley 24. It should be appreciated that the V configuration internal combustion engine may be a four-stroke V-8 or a two-stroke V-4. It should also be appreciated that the V configuration internal combustion engine is conventional and known in the art.

Referring to FIGS. 1 and 2, the planar crankshaft 12 is mounted in suitable bearings (not shown) within the engine block 16 as is known in the art. The planar crankshaft 12 has a shaft 27 with a plurality of lobes or counterweights 28 interconnected by throws or pins 30. It should be appreciated that the planar crankshaft 12 is of the mirror-image type although two other types of planar crankshafts may be used for the V-8. It should also be appreciated that the planar crankshaft 12 is conventional and known in the art.

Referring to FIGS. 1, 3 and 4, the balance system 10, according to the present invention, includes a first balance shaft 32 located above a horizontal plane through the centerline of the planar crankshaft 12 and a second balance shaft 34 located below the horizontal plane. The balance shafts 32, 34 are equidistant from the horizontal plane and are in a common vertical plane which bisects the vee of the first and second banks 20 and 22. The first balance shaft 32 is located above the planar crankshaft 12 inside the vee and is housed or mounted in suitable bearings (not shown) in the block valley 24 of the engine block 16. The second balance shaft 34 is located below the planar crankshaft 12 and housed or mounted in suitable bearings (not shown) in the engine block 16. The second balance shaft 34 may be attached to bearing caps (not shown) as an assembly or integral to a girdle style design of the engine block 16.

As illustrated in FIG. 3, the balance shafts 32 and 34 have at least one or a pair of moment balance lobes 36 spaced axially from each other. The balance shafts 32 and 34 also have at least one shaking force balance lobe 38 disposed between the moment balance lobes 36. For balance shaft manufacturing, this will allow for separate balancing of each set of balance lobes 36, 38—one operation for the moment balance lobes 36 and one operation for the shaking force balance lobes 38.

The balance shafts 32 and 34 have a member 40 such as a gear, sprocket or pulley attached to one end for a function to be described. The shaking force balance lobe 38 is centered on the #3 main bearing (not shown) of the engine 14 and the moment balance lobes 36 are spaced as far as possible for minimal size. The lobes 36 and 38 are weights which, in conjunction with the balance shafts 32 and 34, cancel the second order imbalance of the V-8 using a planar crankshaft which consists of both a shaking force and a moment. It should be appreciated that the balance shafts 32 and 34 can be used with a two-stroke V-4 engine configuration, as well as a four-stroke engine configuration.

Referring to FIG. 4, the balance system 10 includes a member 42 such as a sprocket or pulley attached to one end of the planar crankshaft 12 and an idler, generally indicated at 44, mounted or housed in suitable bearings (not shown) in the engine block 16. The idler 44 includes a shaft (not shown) having a first member 46 such as a sprocket or pulley and a second member 48 such as a helical spur gear. The second member 48 engages the member 40 of the first balance shaft 32. The balance system 10 further includes a belt or chain 50 disposed about the member 40 of the second balance shaft 34, member 42 of the planar crankshaft 12 and the first member 46 of the idler 44. It should be appreciated that the members 42 and 46 are typically either sprockets for a chain drive system or pulleys for a cogged belt drive system.

In operation of the balance system 10, the crankshaft 12 drives or rotates the member 42 which, in turn, moves or drives the belt or chain 50. The belt or chain 50 drives or rotates the member 40 of the second balance shaft 34 and the first member 46 of the idler 44 in the same direction as the planar crankshaft 12. The drive ratios combine to give a 2:1 ratio versus the planar crankshaft 12. Rotation of the idler 44 causes the first member 46 and second member 48 to rotate in the same direction. Engagement between the second member 48 and the member 40 of the first balance shaft 32 causes the second member 48 to rotate the member 40 and first balance shaft 32 in an opposite direction relative to the planar crankshaft 12. The balance shaft 34 rotates in the same direction as the planar crankshaft 12. It should be appreciated that the first and second balance shafts 32 and 34 rotate at twice engine speed.

Referring to FIGS. 5 and 6, another embodiment 110 of the balance system 10 is shown. The balance system 110 has like parts of the balance system 10 with like reference numerals increased by one hundred (100). The balance system 110 includes a first belt or chain 150 disposed about the member 140 of the second balance shaft 134 and the member 142 of the planar crankshaft 12. The balance system 110 also includes a member 152 such as a sprocket or pulley attached to one end of each camshaft 154 of the engine 14. The balance system 110 further includes a member 156 such as a helical spur gear, sprocket or pulley attached to the planar crankshaft 12. As illustrated in FIGS. 5 and 6, the balance system 110 further includes a planetary gearset 158 for the first balance shaft 132. The planetary gearset 158 has the member 140 of the first balance shaft 132 to act as the sun gear. The planetary gearset 158 has a ring gear 160 disposed about the gear 140. The planetary gearset 158 also has a plurality of pinion gears 162 disposed between the ring gear 160 and the gear 140 and attached to a planet carrier (not shown). The planet carrier is held stationary by suitable means (not shown). The balance system 110 also includes a second chain or belt 164 disposed about the members 152 of the camshafts 154, member 156 of the planar crankshaft 12 and the ring gear 160 of the planetary gearset 158.

In operation of the balance system 110, the planar crankshaft 12 drives or rotates the members 142 and 156 which, in turn, moves or drives the belts or chains 150 and 164, respectively. The first belt or chain 150 drives or rotates the member 140 and the second balance shaft 134 in the same direction as the planar crankshaft 12 at twice engine speed. The second belt or chain 164 drives or rotates the members 152 of the camshafts 154 and the ring gear 160 of the planetary gearset 158 in the same direction as the planar crankshaft 12. Rotation of the ring gear 160 causes the pinion gears 162 to rotate and, in turn, rotate the member 140 and first balance shaft 132 in an opposite direction. It should be appreciated that the second balance shaft 134 is driven at a 2:1 ratio and rotates in the same direction as the planar crankshaft 12. It should also be appreciated that the first balance shaft 132 is driven at a 2:1 ratio and rotates in the opposite direction as the planar crankshaft 12.

Figure 7:
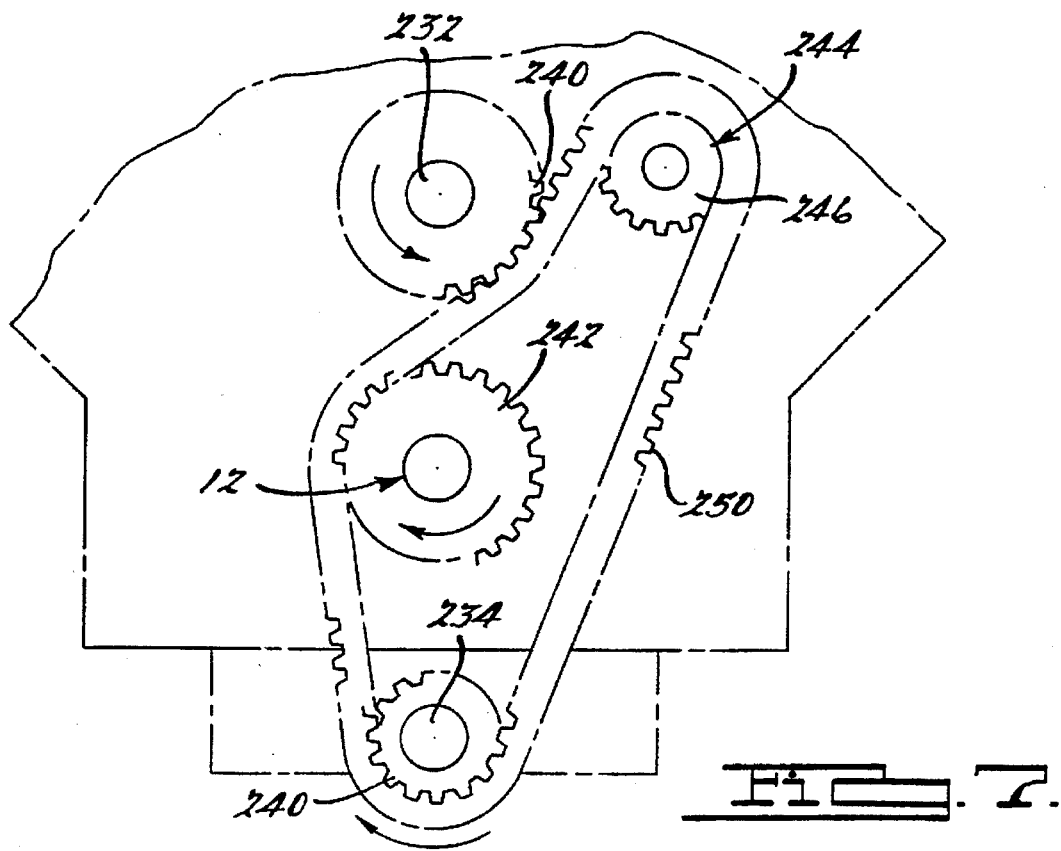
FIG. 7 is a view similar to FIG. 4 of yet another embodiment, according to the present invention, of the balance system of FIG. 1.

Referring to FIG. 7, another embodiment 210 of the balance system 10 is shown. The balance system 210 has like parts of the balance system 10 with like reference numerals increased by two hundred (200). The balance system 210 has only one member 246 of the idler 244.

In operation of the balance system 210, the planar crankshaft 12 drives or rotates the member 242 which, in turn, moves or drives the belt or chain 250. The belt or chain 250 drives or rotates the member 240 and the second balance shaft 234 in the same direction as the planar crankshaft 12. The belt or chain 250 also drives or rotates the member 240 and the first balance shaft 232 in the direction opposite to the planar crankshaft 12. It should be appreciated that the balance shafts 232 and 234 are driven at a 2:1 ratio and in counter-rotation to each other.

Figure 8:
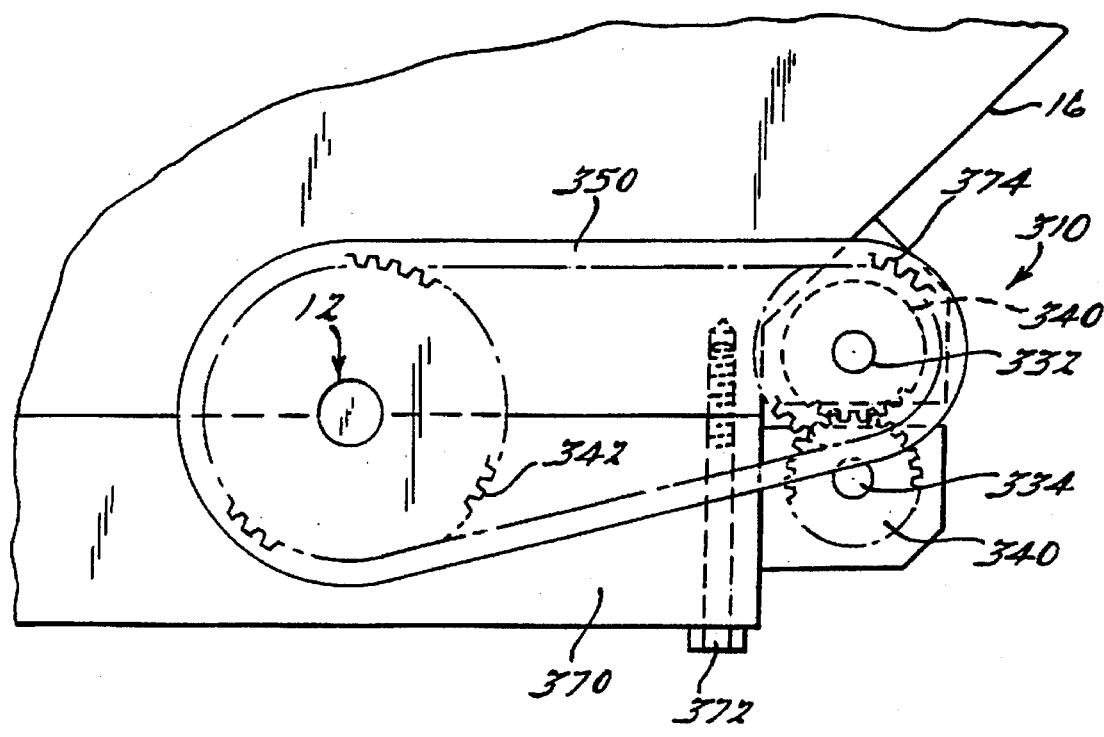
FIG. 8 is a view similar to FIG. 4 of still another embodiment according to the present invention, of the balance system of FIG. 1.

Referring to FIG. 8, another embodiment 310 of the balance system 10 is shown. The balance system 310 has like parts of the balance system 10 with like reference numerals increased by three hundred (300). The balance system 310 is used on a V-8 engine having a girdle 370 attached to the engine block 16 by suitable means such as fasteners 372. The first balance shaft 332 is located in the engine block 16 and the second balance shaft 334 is located in the girdle 370. The members 340 are gears which engage each other. The first balance shaft 332 includes a member 374 such as a sprocket or pulley at one end thereof. The belt or chain 150 is disposed about the member 342 of the planar crankshaft 12 and the member 374 of the first balance shaft 332.

In operation of the balance system 310, the planar crankshaft 12 drives or rotates the member 342 which, in turn, moves or drives the belt or chain 350. The belt or chain 350 drives or rotates the member 374, member 340 and first balance shaft 332 in the same direction as the planar crankshaft 12. Rotation of the member 340 of the first balance shaft 332 causes the rotation of the member 340 and second balance shaft 334 in a direction opposite to the planar crankshaft 12 at twice the speed of the planar crankshaft 12.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A balance system for a planar crankshaft on a V configuration internal combustion engine comprising:
    a first balance shaft located above the planar crankshaft inside a vee of the V configuration internal combustion engine;
    a second balance shaft located below the planar crankshaft;
    a mechanism interconnecting said first balance shaft, the planar crankshaft and said second balance shaft to rotate said first balance shaft and said second balance shaft in opposite directions to balance the engine; and
    each of said first balance shaft and said second balance shaft including at least one shaking force balance lobe and at least one moment balance lobe for canceling a second order imbalance of the V configuration internal combustion engine using the planar crankshaft.

2. A balance system for a planar crankshaft on a V configuration internal combustion engine comprising:
    a first balance shaft located above the planar crankshaft inside a vee of the V configuration internal combustion engine;
    a second balance shaft located below the planar crankshaft;
    a mechanism interconnecting said first balance shaft, the planar crankshaft and said second balance shaft to rotate said first balance shaft and said second balance shaft in opposite directions to balance the engine;
    said mechanism comprising a first member attached to one end of said first balance shaft and a second member attached to one end of said second balance shaft and a third member attached to one end of the planar crankshaft; and
    said mechanism further comprising an idler having a fourth member and a fifth member engaging said first member and means for coupling said second member, said third member and said fourth member together.

3. A balance system for a planar crankshaft on a V configuration internal combustion engine comprising:
    a first balance shaft located above the planar crankshaft inside a vee of the V configuration internal combustion engine;
    a second balance shaft located below the planar crankshaft;
    a mechanism interconnecting said first balance shaft, the planar crankshaft and said second balance shaft to rotate said first balance shaft and said second balance shaft in opposite directions to balance the engine;
    said mechanism comprising a first member attached to one end of said first balance shaft and a second member attached to one end of said second balance shaft and a third member attached to one end of the planar crankshaft and
    said mechanism further comprising a fourth member attached to the planar crankshaft, a fifth member attached to each camshaft of the V configuration internal combustion engine and a planetary gearset attached to said first balance shaft wherein said first member acts as a sun gear of said planetary gearset.

4. A balance system as set forth in claim 3 wherein said planetary gearset comprises a ring gear disposed about said first balance shaft and a plurality of pinion gears disposed between and engaging said ring gear and said sun gear.

5. A balance system as set forth in claim 4 wherein said mechanism further comprises a first means for coupling said second member and said third member together and a second means for coupling said fourth member, said fifth member and said ring gear together.

6. A balance system for a planar crankshaft on a V-8 configuration internal combustion engine comprising:
    a first balance shaft located above the planar crankshaft;
    a second balance shaft located below the planar crankshaft, said first balance shaft and said second balance shaft being located in a common vertical plane parallel to a plane which bisects the vee of a V configuration internal combustion engine;
    means for interconnecting said first balance shaft, the planar crankshaft and said second balance shaft to rotate said first balance shaft and said second balance shaft in opposite directions to balance the engine;
    said means comprising a first member attached to one end of said first balance shaft and a second member attached to one end of said second balance shaft and a third member attached to one end of the planar crankshaft;
    said means further comprising an idler having at least one fourth member and means for coupling said first member, said second member, said third member and said fourth member together; and
    each of said first balance shaft and said second balance shaft including at least one shaking force balance lobe and at least one moment balance lobe for canceling a second order imbalance of the V-8 configuration internal combustion engine using the planar crankshaft.

7. A balance system as set forth in claim 6 wherein said first balance shaft and said second balance shaft are equidistant from a horizontal plane through the centerline of the planar crankshaft.

8. A balance system for a planar crankshaft on a V-8 configuration internal combustion engine comprising:
    a first balance shaft located above the planar crankshaft;
    a second balance shaft located below the planar crankshaft, said first balance shaft and said second balance shaft being located in a common vertical plane parallel to a plane which bisects the vee of a V configuration internal combustion engine;
    means for interconnecting said first balance shaft, the planar crankshaft and said second balance shaft to rotate said first balance shaft and said second balance shaft in opposite directions to balance the engine;
    said means comprising a first member attached to one end of said first balance shaft and a second member attached to one end of said second balance shaft and a third member attached to one end of the planar crankshaft; and said means further comprising an idler having a fourth member and a fifth member engaging said first member and means for coupling said second member, said third member and said fourth member together.

9. A balance system for a planar crankshaft on a V-8 configuration internal combustion engine comprising:

a first balance shaft located above the planar crankshaft;

a second balance shaft located below the planar crankshaft, said first balance shaft and said second balance shaft being located in a common vertical plane parallel to a plane which bisects the vee of a V configuration internal combustion engine;

means for interconnecting said first balance shaft, the planar crankshaft and said second balance shaft to rotate said first balance shaft and said second balance shaft in opposite directions to balance the engine;

said means comprising a first member attached to one end of said first balance shaft and a second member attached to one end of said second balance shaft and a third member attached to one end of the planar crankshaft; and said means further comprising a fourth member attached to the planar crankshaft, a fifth member attached to each camshaft of the V configuration internal combustion engine and a planetary gearset attached to said first balance shaft wherein said first member acts as a sun gear of said planetary gearset.

10. A balance system as set forth in claim 9 wherein said planetary gearset comprises a ring gear disposed about said first balance shaft and a plurality of pinion gears disposed between and engaging said ring gear and said sun gear.

11. A balance system as set forth in claim 10 wherein said means further comprises a first means for coupling said second member and said third member together and a second means for coupling said forth member, said fifth member and said ring together.

12. A V configuration internal combustion engine comprising:

an engine block;

a planar crankshaft mounted in said engine block;

a first balance shaft located above the planar crankshaft between banks of cylinders of the engine block;

a second balance shaft located below the planar crankshaft;

a mechanism interconnecting said first balance shaft, the planar crankshaft and said second balance shaft to rotate said first balance shaft and said second balance shaft in opposite directions at twice crankshaft speed to balance the engine; and a skirt attached to a lower portion of said engine block, said first balance shaft being mounted in said engine block and said second balance shaft being mounted in said skirt.

* * * * *